US006952434B1

(12) United States Patent
Jagannatharao et al.

(10) Patent No.: US 6,952,434 B1
(45) Date of Patent: Oct. 4, 2005

(54) SYSTEM AND METHOD FOR PROCESSING CONTROL CELLS TO PREVENT EVENT MISSEQUENCING AND DATA LOSS IN IMA GROUPS

(75) Inventors: Manjunath Jagannatharao, San Jose, CA (US); Raja Rangarajan, Milpitas, CA (US); Sajunair Madhavan Nair, San Jose, CA (US); Rajagopalan Kothandaraman, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 728 days.

(21) Appl. No.: 09/752,496

(22) Filed: Dec. 27, 2000

(51) Int. Cl.[7] .................................................. H04J 3/04
(52) U.S. Cl. ........................ 370/536; 370/394; 370/395; 370/471; 370/389; 370/395.1; 370/395.7; 370/542
(58) Field of Search ................................ 370/536, 394, 370/395, 471, 389, 395.1, 395.7, 542

(56) References Cited

U.S. PATENT DOCUMENTS

| | | | |
|---|---|---|---|
| 5,065,396 A | | 11/1991 | Castellano et al. |
| 5,333,132 A | | 7/1994 | Chuniad et al. |
| 5,400,324 A | | 3/1995 | Eriksson et al. |
| 5,404,354 A | | 4/1995 | Hayter et al. |
| 5,448,572 A | | 9/1995 | Knox et al. |
| 5,526,361 A | | 6/1996 | Hedberg |
| 5,617,417 A | | 4/1997 | Sathe et al. |
| 5,764,637 A | | 6/1998 | Nishihara |
| 5,970,067 A | | 10/1999 | Sathe et al. |
| 6,002,670 A | * | 12/1999 | Rahman et al. .............. 370/238 |
| 6,205,142 B1 | * | 3/2001 | Vallee ........................ 370/394 |
| 6,222,858 B1 | * | 4/2001 | Counterman ................ 370/474 |
| 6,411,701 B1 | | 6/2002 | Stademann |
| 6,449,658 B1 | | 9/2002 | Lafe et al. |
| 6,549,522 B1 | | 4/2003 | Flynn |
| 6,621,794 B1 | * | 9/2003 | Heikkinen et al. .......... 370/235 |
| 6,678,275 B1 | * | 1/2004 | DeGrandpre et al. ..... 370/395.7 |
| 6,680,954 B1 | * | 1/2004 | Cam et al. .................. 370/474 |
| 6,717,960 B1 | * | 4/2004 | Anesko et al. .............. 370/536 |

FOREIGN PATENT DOCUMENTS

| | | |
|---|---|---|
| WO | WO 90-12467 | 10/1990 |
| WO | WO 93-03569 | 2/1993 |

OTHER PUBLICATIONS

I. Widjajat, et al., "A High–Capacity Broadband Packet Switch Architecture Based on Multilink Approach", MIL-COM '92 Communications–Fusing Command, Control and Intelligence.

PCT Notification of Transmittal of the International Search Report of the Declaration for the International Application No. PCT/US95/10218, 7 pages (Dec. 5, 1995).

Katsuyuki Yamazaki et al., "ATM Transport with Dynamic Capacity Control for Interconnection of Private Networks", IEICE Transcations Comm., vol. E77–B, No. 3, pp. 327–334; 1994.

Richard Valle, et al. The ATM Forum Technical Commitee, Inverse Multiplexing ATM (IMA) Specification, Apr. 1997.

Richard Valle , et al., The ATM Forum Technical Commitee, Inverse Multiplexing ATM (IMA) Specification, (Final Ballot– Draft #1), Dec. 1998.

* cited by examiner

*Primary Examiner*—Steven Nguyen
*Assistant Examiner*—Clemence Han
(74) *Attorney, Agent, or Firm*—Blakely, Sokoloff, Taylor & Zafman LLP (57) ABSTRACT

A system and method for processing control cells to prevent event missequencing and data loss are described. At least one control unit is processed to retrieve communication information related to data received along one or more communication links in a network. The at least one control unit is then stored in one or buffers. Finally, the at least one control unit is further processed to retrieve link information related to the one or more communication links.

56 Claims, 5 Drawing Sheets

SYSTEM AND METHOD FOR PROCESSING CONTROL CELLS TO PREVENT EVENT MISSEQUENCING AND DATA LOSS IN IMA GROUPS

FIELD OF THE INVENTION

This invention relates generally to data communications and, more particularly, to a system and method for processing control cells to prevent event missequencing and data loss in IMA groups.

BACKGROUND

Packet switching communication networks are commonly employed to transfer digital information over long distances. One example of a packet switching communication network is an Asynchronous Transfer Mode (ATM) communication network. An ATM communication network enables the transfer of digital voice information, digital video information and digital data over short or long distances via common carrier communication links. In one embodiment, the ATM communication networks enable a wide variety of communication devices to share common carrier communication links on a demand driven basis. For example, such ATM communication networks are commonly employed for a wide area network (WAN) communication.

In one embodiment, the common carrier communication links employed in such ATM communication networks include metal wire based communication links. One such type of common carrier communication link available in North America is the T1 communication link. In one embodiment, the T1 communication link provides a maximum data rate of 1.544 megabits per second. Alternatively, an E1 communication link may be used as common carrier communication link. In one embodiment, the E1 communication link provides a maximum data rate of 2.048 megabits per second.

Figure 1A:
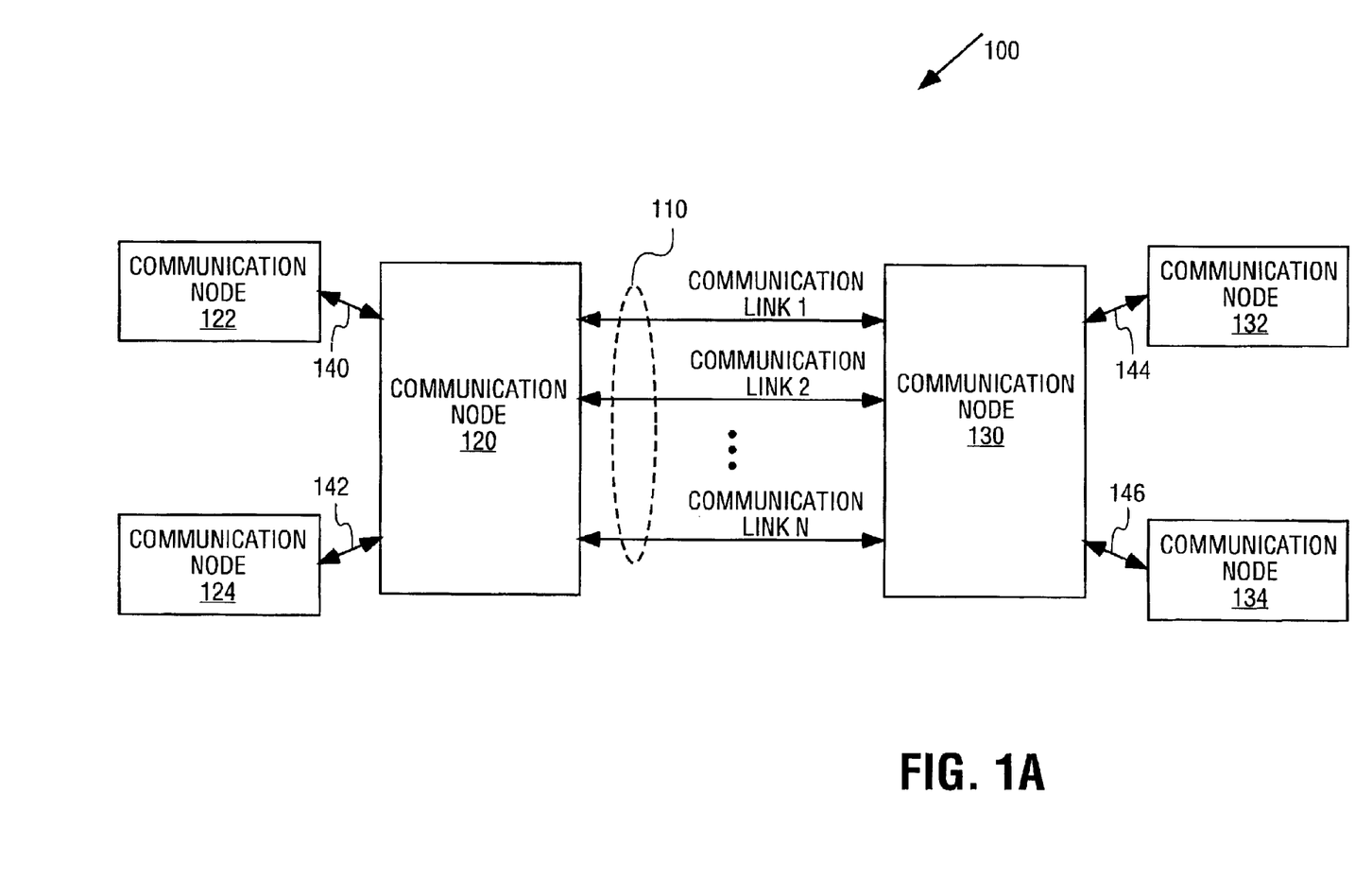
FIG. 1A is a block diagram of one embodiment of a communication network.

FIG. 1A is a block diagram of one embodiment of a communication network. As illustrated in FIG. 1A, communication network 100 includes communication nodes 120 and 130 coupled for communication using a set of communication links 110. In one embodiment, communication network 100 is an ATM communication network. Each communication node 120 and 130 is further coupled to other communication nodes. For example, as shown in FIG. 1A, communication node 120 is coupled to node 122 via link 140 and to node 124 via link 142. In addition, communication node 130 is coupled to node 132 via link 144 and to node 134 via link 146.

In one embodiment, the ATM communication network 100 enables communications according to an Inverse Multiplexing Asynchronous Transfer Mode (IMA) communication protocol. The IMA communication protocol specifies a method of inverse multiplexing of data cells, for example ATM cells, over multiple communication links at the transmitting end and retrieving the ATM cell stream at the receiving end. In one embodiment, communication nodes 120 and 130 perform inverse multiplexing and de-multiplexing of data cells in a cyclical fashion among communication links 1-N grouped to form a higher bandwidth logical link 110 whose rate is approximately the sum of the rates of each communication link 1-N.

In one embodiment, at the near end, for example within transmitting communication node 120, the cell stream is distributed on a cell-by-cell basis, across the multiple communication links 1-N. At the far end, the receiving communication node 130 recombines the cells from each link, on a cell-by-cell basis, recreating the original cell stream.

In addition to AIM cells, the IMA protocol provides for periodic transmission of control cells, defined as IMA Control Protocol (ICP) cells, which contain specific control information for the reconstruction of the ATM cell stream at the receiving end. In one embodiment, one ICP cell is transmitted on each communication link 1-N after a predetermined number of data cells.

In one embodiment, the communication links may have different transmission delays resulting in end-to-end differential delay among the communication links. The information contained within the ICP cells needs to be extracted and processed as soon as the ICP cells arrive at the receiving end. However, when differential delay is present, some ICP cells are delayed, and processing of non-compensated ICP cells at the time of arrival introduces missequencing of the information retrieved, which could lead to inaccurate reconstruction of the data stream and loss of ATM data cells.

Figure 1B:
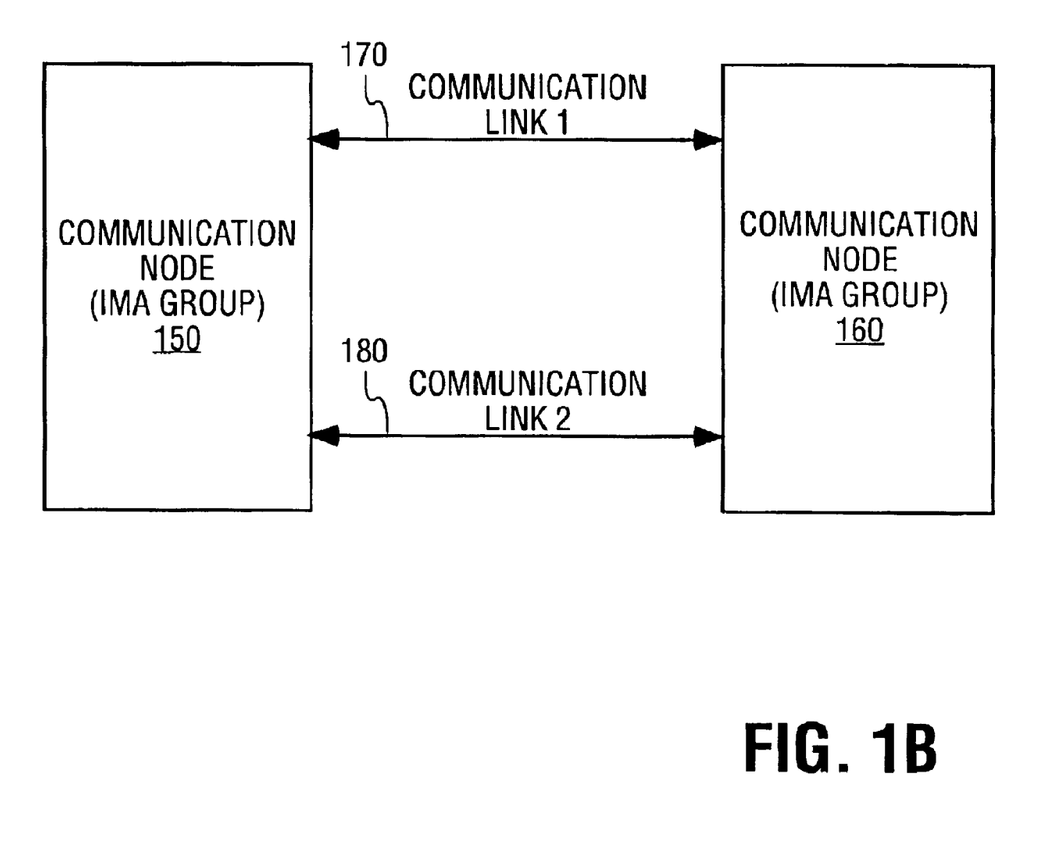
FIG. 1B is a block diagram of an example of a communication. network.

FIG. 1B is a block diagram of an example of a communication network. As illustrated in FIG. 1B, two communication nodes 150 and 160 enable point-to-point IMA communication through communication links 170 and 180. In one embodiment, the communication nodes 150 and 160 are referred to as IMA groups.

In one embodiment, link 170 has a bidirectional delay of 270 milliseconds, which corresponds to 1000 ATM cells. Node 150 has buffered 1000 ATM cells transmitted on link 180, which is the fast link. Node 160 decides to delete link 180. A transmitting fink state machine within node 160 transitions from ACTIVE mode to DELETED mode and filler cells are sent on link 180. At the same time, a receiving link state machine within node 160 also transitions from ACTIVE mode to DELETED mode.

Node 150 receives an ICP cell on both links 170 and 180 indicating the state of both links. Node 150 processes both ICP cells at the same time, without compensating for the delay existent on link 170. A transmitting state machine within node 150 transitions from ACTIVE mode to DELETED mode and filler cells are sent on link 180. At the same time, a receiving state machine within node 150 transitions from ACTIVE mode to USABLE mode and removes link 180 from use. As a result, the already buffered ATM cells are dropped.

SUMMARY OF INVENTION

A system and method for processing control cells to prevent event missequencing and data loss are described. At least one control unit is processed to retrieve communication information related to data received along one or more communication links in a network. The at least one control unit is then stored in one or more buffers. Finally, the at least one control unit is further processed to retrieve link information related to the one or more communication links.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

According to embodiments described herein, a system and method for processing control cells to prevent event missequencing and data loss are described.

FIG. 1A is a block diagram of one embodiment of a communication network. As illustrated in FIG. 1A, the communication network 100 includes communication nodes 120 and 130 coupled for communication using a set of communication links 110. In one embodiment, communication network 100 enables communication according to an Inverse Multiplexing Asynchronous Transfer Mode (IMA) communication protocol Communication nodes 120 and 130 enable point-to-point IMA communication via the set of communication links 110. In one embodiment, each of the communication links 1-N within the set 110 is a T1 common carrier communication link. Alternatively, each communication link 1-N may be an E1 communication link.

In one embodiment, communication nodes 120 and 130 exchange streams of data, for example data units or communication data cells, along the set of communication links 110. The aggregate bandwidth of the set of communication links 110 provides point-to-point communications between communication nodes 120 and 130 at an effective data rate of N times the data rate of each of the individual communication links 1-N within the set 110. For example, in one embodiment wherein the set of communication links 110 includes a set of three T1 common carrier communication links, the maximum effective data rate communication between communication nodes 120 and 130 is 3×1.544 megabits per second.

In one embodiment, communication node 120 transfers outbound sequences of communication data cells to communication node 130 by inverse multiplexing the outbound communication data cells over the set of communication links 110. Communication node 130 receives the inverse multiplexed inbound communication data cells from the communication node 120 over the communication links 1-N and reconstructs the original sequence of communication data cells. Communication node 130 compensates for delays associated with each of the communication links 1-N as described in further detail below.

Similarly, in an alternate embodiment, communication node 130 transmits inverse multiplexed outbound sequences of communication data cells to communication node 120 over the set of communication links 110. Communication node 120 receives the inverse multiplexed inbound communication data cells over the communication links 1-N and reconstructs the original sequence of communication data cells while compensating for the delays associated with transmission along each of the communication links 1-N.

Communication nodes 120 and 130 provide full duplex IMA communication via the set of communication links 110. For purposes of illustration, however, only transmission of communication data cells from transmitting communication node 120 to receiving communication node 130 is described in further detail below.

In one embodiment, the IMA protocol for the communication network specifies the method of inverse multiplexing of communication data cells over the set of multiple communication links 110. Also, the IMA protocol specifies the method of retrieving and multiplexing the data cell stream.

In one embodiment, in addition to the communication data cells, communication node 120 periodically transmits specific control units, defined as IMA Control Protocol (ICP) cells, which contain information that permits reconstruction of the data stream at the receiving end. At predetermined periods of time, after a predetermined number of communication data cells have been transmitted, communication node 120 transmits one ICP cell on each communication link 1-N. In one embodiment, the predetermined period of time is configurable and is calculated based on a frame length associated with the transmitted communication data cells. For example, if the predetermined number of data cells to be transmitted is 127, then the frame length is 128 and one ICP cell is transmitted subsequent to the transmission of the 127 data cells along each communication link. Alternatively, other specified number of data cells may be used in calculating the frame length and the predetermined period of time.

In one embodiment, the transmitting communication node 120 must align the transmission of frames on all communication links 1-N. This action allows the receiving communication node 130 to adjust for differential link delays by comparing frame sequence numbers of the frames on each communication link 1-N.

In one embodiment, each ICP cell contains control information related to the communication between communication nodes 120 and 130. In one embodiment, the control information includes communication information and link information. In one embodiment, communication information further includes frame delineation information, for example the starting and ending points of the frame, and delay information related to each communication link 1-N, for example the frame sequence numbers. In one embodiment, link information further includes for example whether a particular communication link is active or inactive, the order of transmission among communication links 1-N, and state machine information, such as the state of any group state machine, link state machine, group traffic state machine, or error state machine involved in the communication.

In one embodiment, receiving communication node 130 receives the ICP cells transmitted along each communication link within the set of communication links 110 and uses the control information to determine whether any data loss has occurred and to monitor the health of each communication link involved in the communication. For example, if the frame delineation information specifies that the frame length is 128, and only 124 data cells are received between two ICP cells, then data loss has occurred during transmission.

Figure 2:
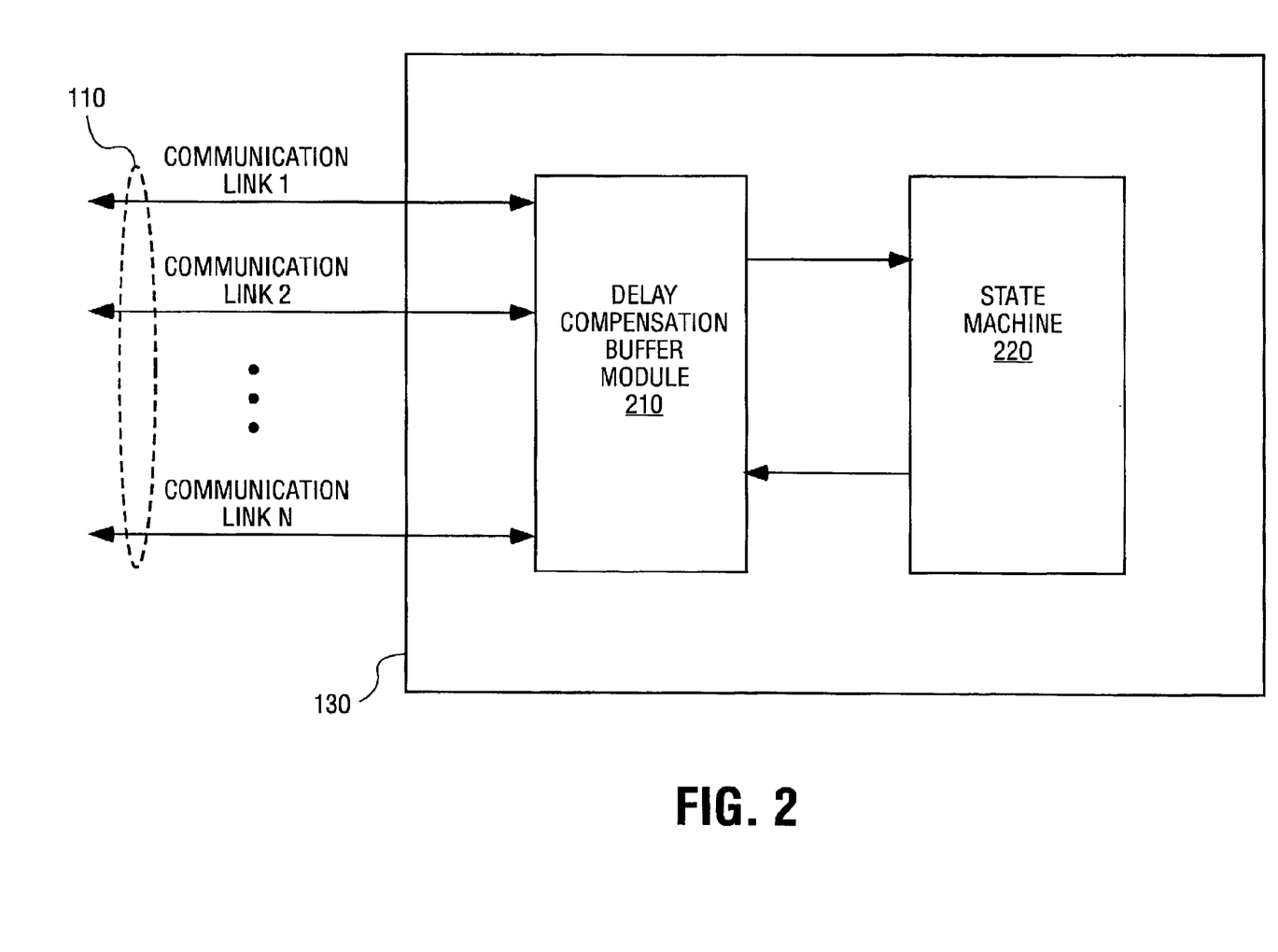
FIG. 2 is a block diagram of one embodiment of a communication node within the communication network.

FIG. 2 is a block diagram of one embodiment of a communication node within the communication network 100. As illustrated in FIG. 2, receiving communication node 130 receives communication data cells and ICP cells along the set of communication links 110, for example communication links 1 through N. Communication node 130 further includes a delay compensation buffer module 210 and a state machine 220 coupled to the buffer module 210. In one embodiment, buffer module 210 receives and stores the inbound communication data cells and the ICP cells transmitted along communication links 1-N. State machine 220 monitors link and group state information received along communication links 1-N. The delay compensation buffer module 210 will be described in further detail below.

Figure 3:
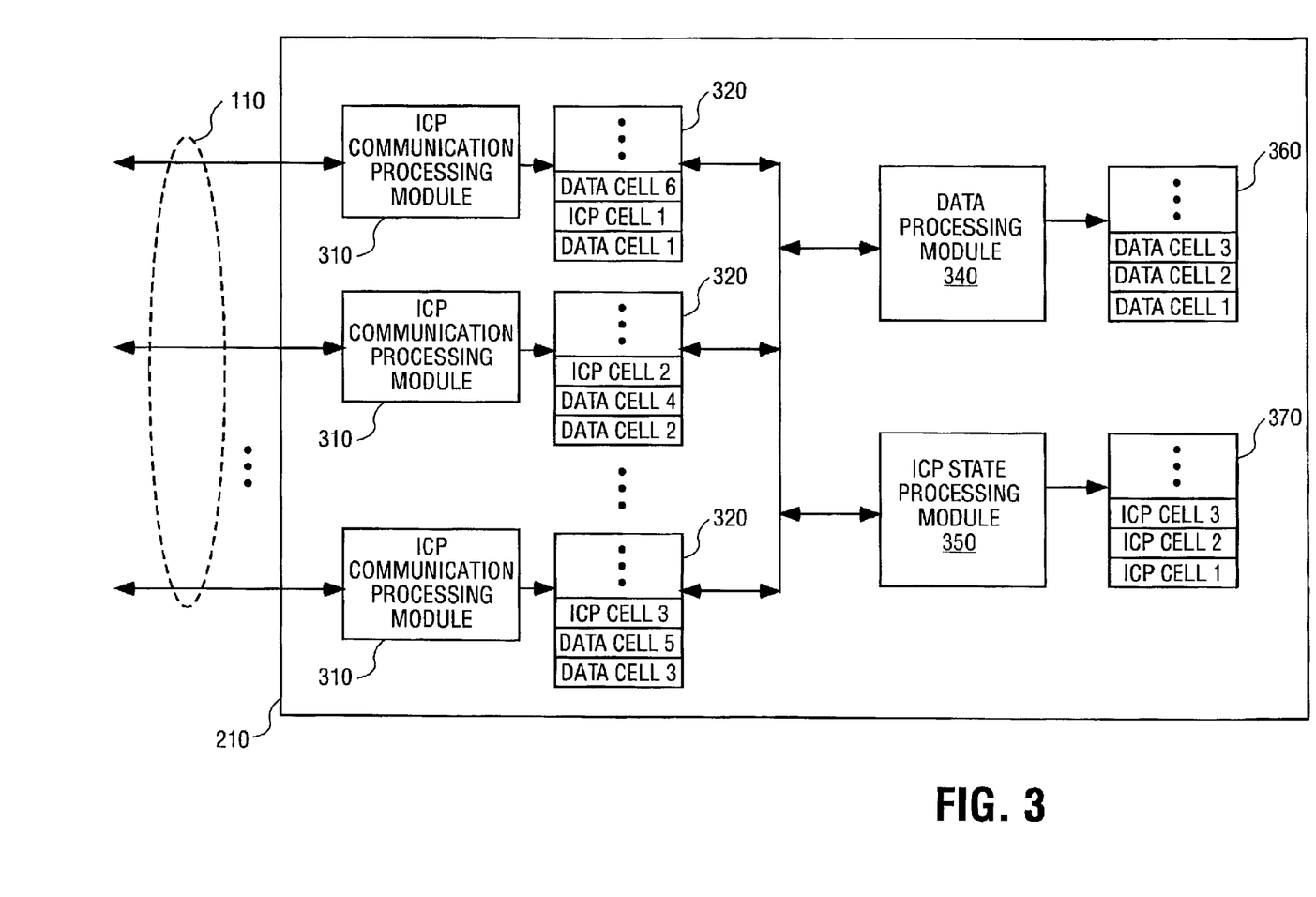
FIG. 3 is a block diagram of one embodiment of a delay compensation buffer module within the communication node.

FIG. 3 is a block diagram of one embodiment of a delay compensation buffer module within the communication node 130. As illustrated in FIG. 3, buffer module 210 includes multiple data buffers 320 configured to receive communication cells transmitted along communication links 1-N within the set of communication links 110. In one embodiment, one data buffer 320 is provided for each communication link 1-N. In FIG. 3, only three data buffers 320 are shown, corresponding to three communication links, respectively. However, it is to be understood that N buffers are provided to correspond to each communication link 1-N. Each data buffer 320 is configured to compensate for the delay existent on the corresponding communication link.

In one embodiment, buffer module 210 further includes a data processing module 340 coupled to the data buffers 320 for processing the stored data cells. Once processed, the data cells are stored in a sequence buffer 360 or passed to the ATM layer. In one embodiment, data cells are stored and processed in the original transmission sequence.

Buffer module 210 further includes multiple ICP communication processing modules 310 and an ICP state processing module 350. In one embodiment, one ICP communication processing module 310 is provided for each communication link 1-N. Each ICP communication processing module 310 is also coupled to one respective data buffer 320. Each ICP communication processing module 310 receives data cells and ICP cells along the respective communication link and transmits the data cells and ICP cells to the corresponding data buffer 320 after the ICP cells are processed. The ICP state processing module 350 is coupled to each data buffer 320 for further processing the ICP cells and for storing the ICP cells in an ICP buffer 370. In one embodiment, the ICP cells are stored in their original transmission sequence.

In one embodiment, each communication link of the set of communication links 110 incorporates a transmission delay resulting in a differential delay among the communication links As the data cells and the ICP cells are received within buffer module 210, they are stored in the order they are received within data buffers 320.

In one embodiment, each ICP communication processing module 310 processes the ICP cells upon arrival to extract communication information, for example the frame delineation information and the delay information associated with the set of communication links 110. Using the frame delineation information and the delay information, a delay profile is constructed within the buffer module 210 to account for the differential delay along the set of communication links 110.

Once queued in the delay compensated data buffers 320, the data cells are not released until link and state machine information is also retrieved to provide a diagnosis of the communication links and of the state machines.

Subsequent to the processing of the ICP cells to extract the communication information, the ICP state processing module 350 transfers the ICP cells to the ICP buffer 370 and stores the ICP cells in their original transmission sequence. As the ICP cells pass through the delay compensation buffer module 210, the ICP state processing module 350 processes the ICP cells to extract the link and state machine information. Because the ICP cells are stored in their original sequence, the link and state machine information is delay compensated and it is obtained in the exact sequence transmitted by the transmitting communication node 120. The link and state machine information provides the status of the communication links and of the state machines within the network and prevents loss of the queued data cells.

Once the data cells are released from the data buffers 320, the data processing module 340 uses the delay information within the delay profile to process the data cells and order them in their original sequence of transmission. The ordered data cells are then stored in the sequence buffer 360 or passed to the ATM layer.

Figure 4:
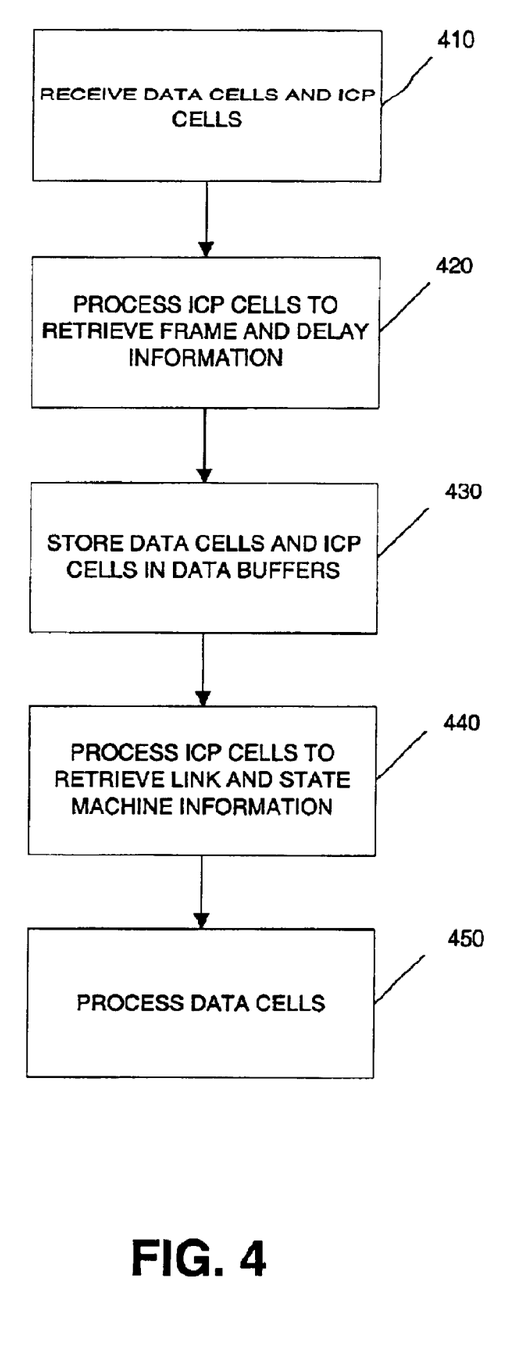
FIG. 4 is a flow diagram of one embodiment of a method for processing control cells to prevent event missequencing and data loss.

FIG. 4 is a flow diagram of one embodiment of a method for processing control cells to prevent event missequencing and data loss. As illustrated in FIG. 4, at processing block 410, data cells and ICP cells are received within the buffer module 210.

At processing block 420, the ICP cells are processed to retrieve frame delineation information and delay information. In one embodiment, a delay profile is constructed based on the delay information retrieved.

At processing block 430, data cells and ICP cells are stored within delay compensated data buffers 32. Each data buffer 320 stores both data cells and ICP cells as they arrive along the set of communication links 110.

At processing block 440, the ICP cells are processed to retrieve link and state machine information and stored in an ICP buffer in their original sequence of transmission.

Finally, at processing block 450, data cells are processed and stored within a sequence buffer 360. In one embodiment, data cells are processed using the delay profile and are stored in their original transmission sequence within the sequence buffer 360. Alternatively, processed data cells are passed to the ATM layer.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that a various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:

processing at least one control unit to retrieve communication information related to data received along at least one communication link in a network, the communication information including frame delineation information and delay information;

storing said at least one control unit in at least one buffer; and processing said at least one control unit to retrieve link information related to said at least one communication link, the link information including at least one of link status information, link transmission order information, and state machine information.

2. The method according to claim 1, further comprising:
receiving said at least one control unit after each frame of a plurality of frames of said data received along said at least one communication link.

3. The method according to claim 2, wherein said processing to retrieve said communication information further comprises:
creating a delay profile in said at least one buffer using said delay information.

4. The method according to claim 3, wherein said processing to retrieve said link information further comprises:
retrieving said link information after a predetermined period of time determined in said delay profile of said buffer.

5. The method according to claim 2, wherein said each frame further comprises a predetermined number of data units.

6. The method according to claim 5, wherein each data unit of said predetermined number of data units is a data cell.

7. The method according to claim 1, wherein said at least one control unit is a control protocol cell.

8. The method according to claim 1, wherein said buffer is a delay compensated buffer.

9. The method according to claim 1, wherein said processing to retrieve said link information further comprises:
retrieving said link information after a predetermined period of time determined in a delay profile of said buffer.

10. The method according to claim 9, wherein said link information further comprises information related to deletion of said at least one communication link.

11. The method according to claim 1, wherein said network is an Asynchronous Transfer Mode (ATM) communication network.

12. The method according to claim 11, wherein said network enables communication according to an Inverse Multiplexing Asynchronous Transfer Mode (IMA) communication protocol.

13. The method according to claim 1, wherein said at least one communication link is a T1 communication link.

14. The method according to claim 1, wherein said at least one communication link is an E1 communication link.

15. A system comprising:
at least one communication processing module for processing at least one control unit to retrieve communication information related to data received along at least one communication link in a network, the communication information including frame delineation information and delay information;
at least one buffer coupled to said at least one communication processing module for storing said at least one control unit; and
a state processing module coupled to said at least one buffer for processing said at least one control unit to retrieve link information related to said at least one communication link, the link information including at least one of link status information, link transmission order information, and state machine information.

16. The system according to claim 15, wherein said at least one communication processing module further receives said at least one control unit after each frame of a plurality of frames of said data received along said at least one communication link.

17. The system according to claim 16, wherein said at least one communication processing module further creates a delay profile in said at least one buffer using said delay information.

18. The system according to claim 17, wherein said at least one state processing module further retrieves said link information after a predetermined period of time determined in said delay profile of said buffer.

19. The system according to claim 16, wherein said each frame further comprises a predetermined number of data units.

20. The system according to claim 19, wherein each data unit of said predetermined number of data units is a data cell.

21. The system according to claim 15, wherein said at least one control unit is a control protocol cell.

22. The system according to claim 15, wherein said buffer is a delay compensated buffer.

23. The system according to claim 15, wherein said at least one state processing module further retrieves said link information after a predetermined period of time determined in a delay profile of said buffer.

24. The system according to claim 23, wherein said link information further comprises information related to deletion of said at least one communication link.

25. The system according to claim 15, wherein said network is an Asynchronous Transfer Mode (ATM) communication network.

26. The system according to claim 25, wherein said network enables communication according to an Inverse Multiplexing Asynchronous Transfer Mode (IMA) communication protocol.

27. The system according to claim 15, wherein said at least one communication link is a T1 communication link.

28. The system according to claim 15, wherein said at least one communication link is an E1 communication link.

29. A computer readable medium containing executable instructions which, when executed in a processing system, cause the system to perform a method comprising:
processing at least one control unit to retrieve communication information related to data received along at least one communication link in a network, the communication information including frame delineation information and delay information;
storing said at least one control unit in at least one buffer; and
processing said at least one control unit to retrieve link information related to said at least one communication link, the link information including at least one of link status information, link transmission order information, and state machine information.

30. The computer readable medium according to claim 29, wherein the method further comprises:
receiving said at least one control unit after each frame of a plurality of frames of said data received along said at least one communication link.

31. The computer readable medium according to claim 30, wherein said processing to retrieve said communication information further comprises:
creating a delay profile in said at least one buffer using said delay information.

32. The computer readable medium according to claim 31, wherein said processing to retrieve said link information further comprises:
retrieving said link information after a predetermined period of time determined in said delay profile of said buffer.

33. The computer readable medium according to claim 30, wherein said each frame further comprises a predetermined number of data units.

34. The computer readable medium according to claim 33, wherein each data unit of said predetermined number of data units is a data cell.

35. The computer readable medium according to claim 29, wherein said at least one control unit is a control protocol cell.

36. The computer readable medium according to claim 29, wherein said buffer is a delay compensated buffer.

37. The computer readable medium according to claim 29, wherein said processing to retrieve said link information further comprises:

retrieving said link information after a predetermined period of time determined in a delay profile of said buffer.

38. The computer readable medium according to claim 37, wherein said link information further comprises information related to deletion of said at least one communication link.

39. The computer readable medium according to claim 29, wherein said network is an Asynchronous Transfer Mode (ATM) communication network.

40. The computer readable medium according to claim 39, wherein said network enables communication according to an Inverse Multiplexing Asynchronous Transfer Mode (IMA) communication protocol.

41. The computer readable medium according to claim 29, wherein said at least one communication link is a T1 communication link.

42. The computer readable medium according to claim 29, wherein said at least one communication link is an E1 communication link.

43. A system comprising:

means for processing at least one control unit to retrieve communication information related to data received along at least one communication link in a network, the communication information including frame delineation information and delay information;

means for storing said at least one control unit in at least one buffer; and means for processing said at least one control unit to retrieve link information related to said at least one communication link, the link information including at least one of link status information, link transmission order information, and state machine information.

44. The system according to claim 43, further comprising:

means for receiving said at least one control unit after each frame of a plurality of frames of said data received along said at least one communication link.

45. The system according to claim 44, further comprising:

means for creating a delay profile in said at least one buffer using said delay information.

46. The system according to claim 45, further comprising:

means for retrieving said link information after a predetermined period of time determined in said delay profile of said buffer.

47. The system according to claim 44, wherein said each frame further comprises a predetermined number of data units.

48. The system according to claim 47, wherein each data unit of said predetermined number of data units is a data cell.

49. The system according to claim 43, wherein said at least one control unit is a control protocol cell.

50. The system according to claim 43, wherein said buffer is a delay compensated buffer.

51. The system according to claim 43, further comprising:

means for retrieving said link information after a predetermined period of time determined in a delay profile of said buffer.

52. The system according to claim 51, wherein said link information further comprises information related to deletion of said at least one communication link.

53. The system according to claim 43, wherein said network is an Asynchronous Transfer Mode (ATM) communication network.

54. The system according to claim 53, wherein said network enables Inverse Multiplexing Asynchronous Transfer Mode (IMA) communication protocol.

55. The system according to claim 43, wherein said at least one communication link is a T1 communication link.

56. The system according to claim 43, wherein said at least one communication link is an E1 communication link.

* * * * *